US010318794B2

(12) United States Patent
Lee et al.

(10) Patent No.: US 10,318,794 B2
(45) Date of Patent: Jun. 11, 2019

(54) INTELLIGENT AUTO CROPPING OF DIGITAL IMAGES

(71) Applicant: Microsoft Technology Licensing, LLC, Redmond, WA (US)

(72) Inventors: David Benjamin Lee, Sammamish, WA (US); Erez Kikin Gil, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/582,087

(22) Filed: Apr. 28, 2017

(65) Prior Publication Data

US 2018/0314878 A1    Nov. 1, 2018

(51) Int. Cl.
*G06K 9/00* (2006.01)
*G06T 11/60* (2006.01)
*G06K 9/32* (2006.01)

(52) U.S. Cl.
CPC ..... *G06K 9/00228* (2013.01); *G06K 9/00308* (2013.01); *G06K 9/3241* (2013.01); *G06T 11/60* (2013.01); *G06T 2210/22* (2013.01)

(58) Field of Classification Search
CPC ........... G06K 9/00302; G06K 9/00222; G06K 9/00287; G06K 9/00281; G06K 9/00248; G06K 9/00288; G06K 9/00228; G11B 27/036; G06T 11/60
See application file for complete search history.

(56) References Cited

U.S. PATENT DOCUMENTS

| | | | |
|---|---|---|---|
| 6,430,320 | B1 | 8/2002 | Jia et al. |
| 6,654,507 | B2 | 11/2003 | Luo |
| 6,956,587 | B1 | 10/2005 | Anson |
| 6,970,607 | B2 | 11/2005 | Jia et al. |
| 8,189,916 | B2 | 5/2012 | Grosvenor |
| 8,218,830 | B2 | 7/2012 | Gavin et al. |
| 8,326,078 | B2 | 12/2012 | Reddy et al. |
| 8,755,610 | B2 | 6/2014 | Holland et al. |

(Continued)

FOREIGN PATENT DOCUMENTS

| | | |
|---|---|---|
| EP | 2753070 A1 | 7/2014 |
| WO | 2010151255 A1 | 12/2010 |
| WO | 2015041641 A1 | 3/2015 |

OTHER PUBLICATIONS

"ABBYY FineReader 8.0 Pro", http://www.rla.com/assistive/software/abbyy/finereader.htm, Published on: Mar. 15, 2015, 5 pages.

(Continued)

*Primary Examiner* — Amir Alavi
(74) *Attorney, Agent, or Firm* — Schwegman Lundberg & Woessner, P.A.

(57) ABSTRACT

Disclosed in some examples are methods, systems, computing devices, and machine readable mediums that provide for cropping systems that automatically crop digital images using one or more smart cropping techniques. Smart cropping techniques may include: cropping an image based upon emotion detection, cropping based upon facial recognition and matching, and cropping based upon landmark matching. In some examples, a single smart cropping technique may be utilized. In other examples, a combination of the smart cropping techniques may be utilized.

20 Claims, 8 Drawing Sheets

(56) References Cited

U.S. PATENT DOCUMENTS

| | | |
|---|---|---|
| 8,832,570 B1 | 9/2014 | Marra |
| 8,873,864 B2 | 10/2014 | Dolan et al. |
| 9,076,221 B2 | 7/2015 | Xiong et al. |
| 9,165,388 B2 | 10/2015 | Delia et al. |
| 9,245,347 B2 | 1/2016 | Lin et al. |
| 2006/0280364 A1 | 12/2006 | Ma et al. |
| 2011/0110604 A1 | 5/2011 | Reddy |
| 2013/0108164 A1 | 5/2013 | Ptucha |
| 2013/0271361 A1* | 10/2013 | Velusamy ............... G06F 3/011 345/156 |
| 2016/0188635 A1 | 6/2016 | Shah et al. |
| 2017/0109571 A1* | 4/2017 | McDuff ............. G06K 9/00302 |
| 2017/0124740 A1* | 5/2017 | Campbell ........... G06F 3/04847 |
| 2017/0126772 A1* | 5/2017 | Campbell ............. G06F 17/212 |
| 2017/0171614 A1* | 6/2017 | el Kaliouby ..... H04N 21/44218 |
| 2017/0270970 A1* | 9/2017 | Ho ...................... G11B 27/036 |

OTHER PUBLICATIONS

Eric, "Pixlr Editor: Cutting Things Out the Easy Way Using the Magic Wand", http://pixlr.com/blog/cutting-things-out-the-easy-way-using-the-magic-wand/, Published on: Jun. 19, 2013, 7 pages.

"Smart Cropping API", https://imagga.com/solutions/cropping-api.html, Published on: Nov. 17, 2016, 4 pages.

"AutoSplitter", http://autosplitter.com/, Published on: Dec. 31, 2016, 5 pages.

"Automatically Cropping / Removing Black Borders from Your Scans", https://slidesnappro.com/auto-cropping-software/, Published on: Jun. 28, 2015, 5 pages.

Dhall, et al., "Facial Expression Based Automatic Album Creation", In Proceedings of International Conference on Neural Information Processing., Nov. 22, 2010, 8 Pages.

"International Search Report & Written Opinion for PCT Patent Application No. PCT/US2018/026640", dated Jul. 11, 2018, 13 Pages.

* cited by examiner

US 10,318,794 B2

INTELLIGENT AUTO CROPPING OF DIGITAL IMAGES

BACKGROUND

Digital image capture has exploded thanks to small, light, and inexpensive digital cameras. These cameras focus light onto a light sensor such as a Charge Coupled Device (CCD), a Complementary metal-oxide-semiconductor (CMOS), or other light sensor. The light sensor then converts the light into a digital representation of the image.

SUMMARY

Some examples disclosed herein pertain to image processing. Some examples disclosed herein relate to processing a digital image by cropping the image. For example, the system may receive a digital image, detect faces in the digital image and for each particular face determine an emotion displayed by the particular face. The detected faces are clustered into two or more clusters, each particular cluster comprising faces displaying emotions that are the same or are classified as related to other faces in the particular cluster. The system may then select a cluster of the two or more clusters and crop the digital image based upon the faces in the selected cluster. Other cropping techniques are also discussed, including cropping based upon facial recognition matching with other faces in other images, and landmark detection.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
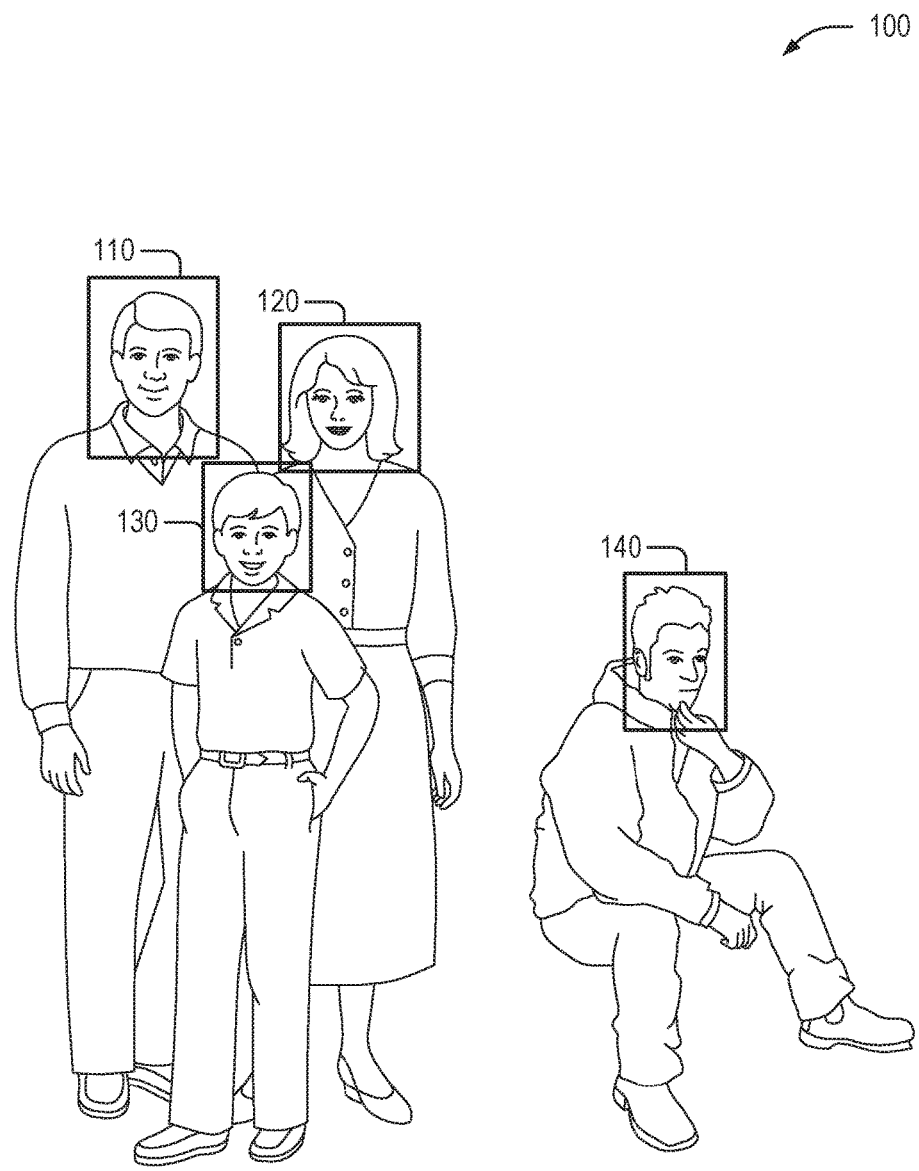
FIG. 1 shows an example digital image according to some examples of the present disclosure.

The explosion of digital image capture has also led to an explosion in the different usages of digital images. Aside from storing images in digital storage (e.g., on a hard-disk drive or a solid state drive) or network-based (cloud) storage, users may share images on social networks, place them in files, presentations, online, photo sharing services, and the like. Before these pictures are stored or utilized, many users will want to modify or adjust the settings of the pictures. For example, the brightness, contrast, zoom, and in some examples, cropping the image. Cropping an image is an image operation that removes a portion of the image (e.g., the outer portions) to improve framing, accentuate subject matter, or change aspect ratio. Such cropping may be useful to remove undesirable backgrounds, objects, people, or other things from the image.

These image modifications may be difficult to accomplish on a smartphone or other mobile device. For example, the limited screen real-estate and input options may make cropping manually cumbersome. Due to these frustrations, many users download the pictures to a desktop computer, and edit the digital image there using the larger display and easier input options (e.g., a mouse, keyboard, and the like). This slows down the time between capturing the image and making use of the image and provides an annoyance to the user.

Disclosed in some examples are methods, systems, computing devices, and machine readable mediums that provide for cropping systems that automatically crop digital images using one or more smart cropping techniques. Smart cropping techniques may include: cropping an image based upon emotion detection, cropping based upon facial recognition and matching, and cropping based upon landmark matching. In some examples, a single smart cropping technique may be utilized. In other examples, a combination of the smart cropping techniques may be utilized. The system utilizes the one or more smart cropping techniques to produce a proposed cropping region in the digital image. The proposed cropping region is the area of the image that will remain after the cropping operation. The computing device may then display the digital image with the proposed cropping region represented by lines (or curves) superimposed on the digital image. The user may then accept the proposed cropping region as-is or modify the proposed cropping region. User acceptance of the proposed cropping region without modifications may serve as positive reinforcement that may be utilized to refine the cropping system. User modification or rejection of the proposed cropping rectangle may serve as negative reinforcement that may be also utilized to refine one or more machine learning models. The methods and systems disclosed herein may operate on single images, or may be performed on multiple images in succession.

Smart Cropping Using Emotion Detection

In some examples, the system may crop the image based upon emotion detection of persons in the digital image. That is, the system may detect one or more faces in the digital image, process the faces to determine emotions expressed by those faces and then crop based upon the facial emotions. For example, the system may crop to (e.g., leave in the final image) all faces expressing the same (or similar) emotions. This may be allow the system to differentiate between faces of a group of users that are together (e.g., posing for a photograph) vs. individuals who are simply passing by or who are otherwise not part of the group. Typically individuals posing together for a photo would display similar emotions (e.g., happiness, or other emotions).

Turning now to FIG. 1, an example digital image 100 is shown according to some examples of the present disclosure. The system has detected faces 110, 120, 130, and 140.

In some examples face detection may be accomplished using a genetic algorithm and an eigen-face technique. For example, possible human eye regions are detected by testing all the valley regions in a gray-level representation of the image. The genetic algorithm may then calculate candidate face regions (e.g., nose, mouth, and chin). Candidate face regions may be normalized and the fitness value of the candidates may be measured using a projection on the eigen-faces. Face candidates with a fitness value above a threshold may be selected.

Once faces are detected, they may be processed to determine emotions. In some examples, to determine emotions, the system may utilize a coding scheme such as the Facial Action Coding System (FACS) developed by Paul Ekman to code facial expressions and use those codes as input into a Bayesian network to determine emotions from the facial codes. Faces expressing similar emotions may be clustered together. For example, a group of smiling persons may be clustered together, as a smile may be associated with happiness. The system may then select one or more of the clusters and output the locations of the detected faces within that cluster as areas of interest for determining a proposed cropping region. In some examples, the areas of interest are only the faces, but in other examples, the areas of interest may extend to include the body of the detected face. As noted, the proposed cropping region is a region of the original image that is the final output image. Thus, the system crops-to the proposed cropping region, deleting the image outside the cropping region and utilizing the cropping region as the new image. A controller may then produce the proposed cropping region based upon these areas of interest (and in some examples, areas of interest output by other techniques). The controller may then crop to these regions of interest.

If more than one cluster of similar emotions are present, to select one or more of the clusters (wherein the faces in the clusters are the areas of interest identified by the smart cropping based upon emotion detection), various algorithms may be utilized. For example, the system may select the cluster that is closest to the center of the image. For example, in FIG. 1, the system may cluster faces 110-130 into one group and face 140 into another group. In other examples, the cluster with the highest number of detected faces may be selected. In yet other examples, a facial recognition matching algorithm may be utilized to select clusters. That is, the system may determine a match between a face in a cluster of the digital image and stored images from an image library of the user. The algorithms used to achieve this are the same or similar as the algorithms utilized in the smart cropping using facial recognition matching discussed elsewhere in the present disclosure. The system may select all clusters including a face that match a face in a photo in a user's photo library (e.g., online or locally stored) or a face that matches a face in a photo posted by them to their social networking account or by their friends (i.e., connections) on their social networking accounts may be selected and used to determine the regions of interest.

In some examples, just the faces are returned as areas of interest, but in other examples, the entire person corresponding to the selected faces are included as areas of interest. This allows for wider shots. Whether the face or whether the entire body of the user is included may be a selectable option that the user may select.

Smart Cropping Using Facial Recognition Matching

In some examples, to determine areas of interest used to determine a cropping region a library of images or photos posted to a social networking service (either to the user's profile or to the profiles of the user's connections) may be used to recognize faces of people familiar to the user. Facial recognition techniques such as principal component analysis using eigen-faces, linear discriminant analysis, elastic bunch graph matching, hidden Markov models, and the like may be utilized. For example, the algorithm may identify facial features by extracting landmarks (e.g., size and shape of the eyes, position of the mouth, and shape of the jaw) from an image of the subject's face. These features may be utilized to search for other images in a library of images that have similar features.

The presence of a matching face in a library of pictures or posted to a social networking page or site corresponding to the user suggests that the user knows the person and would like that person in the final cropped image. In addition to a personal library of a user's pictures, the system may have a library of pictures of famous persons. Thus, if the user meets a famous person and takes a picture, the system may recognize the famous person as someone that should be included in the cropped photo.

As noted, the system may select one or more of the recognized faces for outputting as areas of interest. For example, in FIG. 1, if the system determines that faces 110-130 are in previous pictures in the user's library, but not face 140, the system may output the rectangles around the faces as areas of interest to a controller that may then determine the final proposed cropping rectangle (or other shape). In some examples, all faces that are recognized are returned as areas of interest, but in other examples, some recognized faces may be returned as areas of interest while others are ignored. For example, the facial recognition algorithm may have a confidence value that numerically represents the confidence that the algorithm has that the face in the digital image matches a face in a picture in the user's digital library or on social media. Faces with confidence scores above a predetermined threshold may be returned as areas of interest, whereas faces with confidence scores below the predetermined threshold may be ignored. In other examples, in cases where multiple faces are detected, other algorithms may be used to select from multiple recognized faces. For example, emotion detection may be applied to select recognized faces with similar emotions. In some examples, a predetermined number of recognized faces nearest the center of the image may be chosen.

As noted above, the areas of interest may be returned to a controller that may then determine a cropping region based upon the identified areas of interest. As with the emotion detection smart cropping, in some examples, just the faces are returned as areas of interest, but in other examples, the entire person corresponding to the selected faces are included as areas of interest. This allows for wider shots. Whether the face or whether the entire body of the user is included may be a selectable option that the user may change. While facial recognition matching was described, in other examples, an entire body may be matched and detected. For example, a person's body shape may be matched to a body shape of a person that is in a different picture in a picture library.

Landmark Detection

In addition to facial detection, the system may compare the digital image to a plurality of stored images of various famous landmarks. Example landmarks may include the Statute of Liberty, the Eiffel Tower, the Washington Monument, Lincoln Memorial, and more. The landmarks may be manmade, natural, or the like. In some examples, the system may utilize metadata about the image (e.g., geolocation) to determine likely landmarks. The system may select one of the recognized landmarks for outputting as areas of interest.

Methods may utilize machine learning. For example, photos may utilize multiple layers of clustering to first cluster images based on geolocation, then each geolocation cluster may be clustered based upon visual appearance. Each of these clusters may then be a model specific to a particular landmark. A new digital image may be compared to each of these models to determine the closest fit (e.g., using k-nearest neighbor). The algorithm may then assign the landmark to the image based upon determining that a confidence score is above a predetermined threshold. The bounding box for the landmark may be utilized as the area of interest.

For instances in which multiple landmarks may be present, the landmark detection may utilize all landmarks as areas of interest. In other examples, one or more of the landmarks may be selected. For example, landmarks nearest identified faces or nearest a group of faces displaying similar emotions, or the like.

Combinations

The above methods may be utilized alone, or in combination. For example, as already mentioned, some methods may be utilized to refine the above methods and assist them in selecting from multiple options. In other examples, methods may be run separately and the areas of interest identified by each method may be utilized to create the proposed cropping region. In some examples, the proposed cropping region may include all the areas of interest identified by the various cropping techniques. In other examples, the areas of interest may have a corresponding confidence score that reflect a numerical indication of the confidence that the technique has that the area of interest is valid. Areas of interest with confidence scores above a predetermined threshold may be utilized to create the proposed cropping region. In other examples, the confidence scores may be multiplied by a weighting factor that reflects a perceived accuracy of the technique to produce a weighted score for that area of interest. The weighting factors may be predetermined or may be based upon a machine learned model (e.g., a regression model, a neural network) that learns and/or adjusts weightings for each of the techniques based upon user feedback. Multiple techniques may identify the same, or overlapping areas of interest. In some examples, the areas of interest are clustered based upon their proximity in the image. Each cluster's associated weighted scores are summed to produce a cluster score. The proposed cropping region may be the smallest rectangle that includes all clusters with scores above a predetermined threshold.

Figure 2:
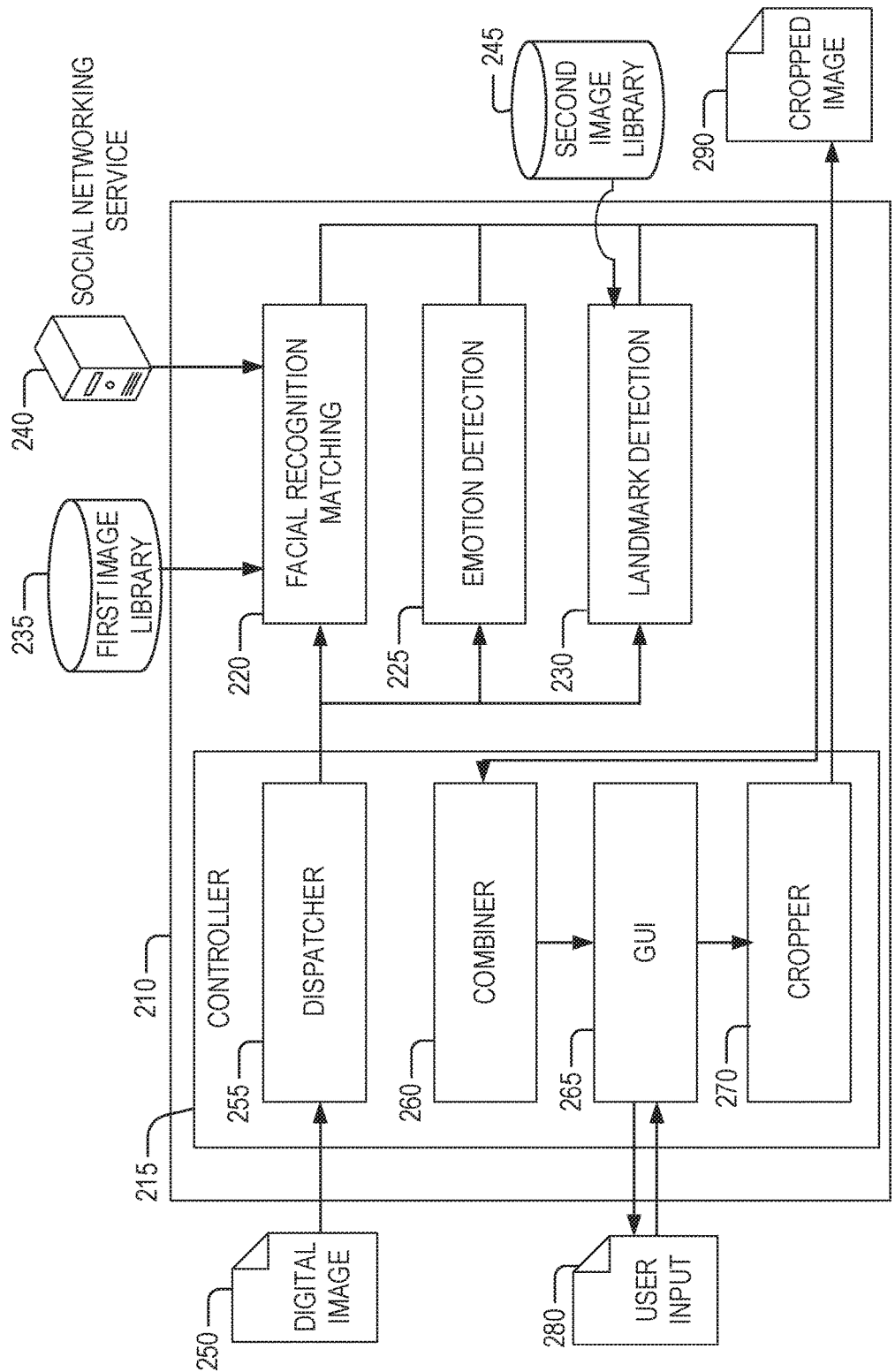
FIG. 2 shows a diagram of a cropping system according to some examples of the present disclosure.

Turning now to FIG. 2 a diagram of a cropping system 210 is shown according to some examples of the present disclosure. Cropping system 210 may be implemented on one or more computing devices (e.g., a mobile device). The components of cropping system 210 shown in FIG. 2 may be implemented as software (e.g., software modules) or hardware (e.g., dedicated processing components). Cropping system 210 may include a controller 215, and one or more cropping determiners that apply different cropping methods, such as facial recognition determiner 220, emotion detection determiner 225, and landmark detection determiner 230. Cropping system 210 may interface with external systems, such as first image library 235. First image library 235 may be a storage location on a computing device of the user (e.g., where the cropping system 210 is also running or a different system), a cloud storage system (e.g., a network based image storage system), and the like. The first image library 235 may be specific to a particular user or group of users e.g. in contrast to image libraries that store images from unrelated or unaffiliated persons. Cropping system 210 may also interface with a social networking service 240. Cropping system 210 may retrieve or scan pictures shared by the user, or by the user's connections for purposes of facial matching using the facial recognition determiner 220. The cropping system 210 may provide for user privacy controls and may be permission based such that the cropping system 210 only accesses files and images with user consent. The cropping system 210 may also interface with a second image library 245 which may contain a library of images of landmarks that may be utilized by the landmark detection determiner 230 to determine if any landmarks are present in a digital image.

A digital image, such as digital image 250 may be received by the controller 215. The controller 215 may include a dispatcher 255. Dispatcher 255 may send the digital image 250 to one, more than one, or all of the cropping determiners, such as facial recognition determiner 220, emotion detection determiner 225, landmark detection determiner 230, and other cropping determiners that are not shown. In some examples, the cropping determiners may be plug-ins that may be added, removed, updated, or otherwise modified without having to change the code of the cropping system 210 other than to change or add the plug-in.

Cropping determiners may search for one or more areas of interest in the digital image and output those areas of interest back to the controller 215. Combiner may receive the areas of interest from the various cropping determiners. In some examples, each cropping determiner may return one or more areas of interest. In some examples, areas of interest may include associated confidence levels that quantify how confident the cropping determiners are that the returned areas of interest are areas of interest to the user.

Combiner 260 may take these areas of interest and produce a proposed cropping region. The proposed cropping region may be a cropping area, such as a cropping rectangle, a cropping circle, or other area. This proposed cropping region, as previously explained, is the region of the image that is left after the cropping region. That is, regions of the image outside the cropping region are cropped out. For example, the combiner 260 may select one, multiple, or all of the areas of interest returned by the cropping determiners and crop such that these areas of interest are included in the proposed cropping region. In the process, the combiner 260 may crop-out (e.g., remove) one or more of the areas of interest that were not selected, and/or areas of the image that were not identified as areas of interest. In the present disclosure, the proposed cropping region refers to the area left in the image after the crop is completed (e.g., the image is cropped to the cropping region). In some examples, the combiner may select all the returned areas and determine a proposed cropping region that may include all the areas of interest. In some examples, the cropping region may be a rectangle that is a size that is of a minimum size (or within a predetermined amount of pixels to a minimum size) to encompass all the areas of interest. In some examples, the cropping region may be another shape that may encompass one or more of the areas of interest.

In other examples, the combiner 260 may not include all of the areas of interest and instead may select some, but not others. For example, the combiner 260 may utilize a weighting function that may weigh the confidence values of each area of interest returned by the cropping determiners to produce a score for each area of interest. Areas of interest that score above a predetermined threshold score may be included in the cropping region. Areas of interest that score below a predetermined threshold may not be considered in the determination of the cropping region. That is, they may end up in the cropping region by virtue of being in a location that is included as a result of determining the cropping area based upon other regions of interest, but those areas of interest are not used to determine the cropping region. The weights used may be machine-learned weights (e.g., using a regression algorithm). The weights may be trained using manually labelled example images. As an example method of determining a cropping region, the combiner may iterate through all the areas of interest to find the topmost, leftmost, rightmost, and bottommost points of interest and then set the cropping area to be a rectangle with a top, left, right, and bottom lines corresponding to these points.

Once a proposed cropping region is determined by combiner 260, in some examples, the GUI 265 may output the image with the cropping region identified. The GUI may be displayed on a computing device of the user. In some examples, the computing device of the user may be a computing device executing the cropping system 210, but in other examples, may be a different computing device. For example, the cropping system 210 may be a network-based service and the GUI may be sent by the cropping system 210 to a computing device of a user over a network. The user may then provide input 280 accepting, rejecting, or adjusting the cropping region. In some examples, the input 280 may be utilized to refine the machine learned weights of the combiner 260, or machine learned algorithms that are used by the cropping determiners.

Cropper 270 applies the proposed cropping region (in some examples, as potentially modified by GUI 265 as a result of user input 280) to crop the image such that the areas outside the cropped region of the digital image 250 are removed to produce cropped image 290.

Figure 3:
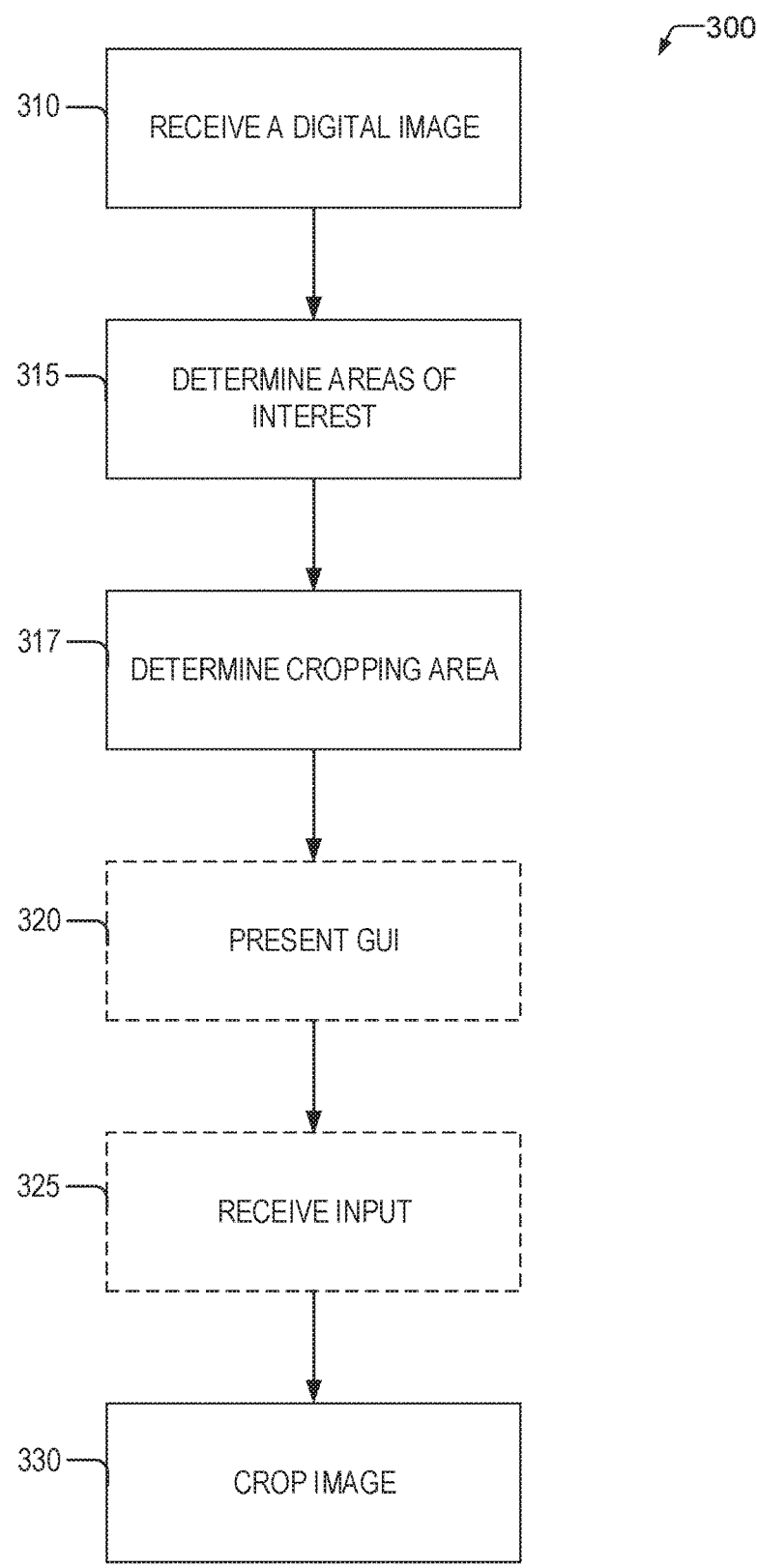
FIG. 3 shows a method for automatically cropping an image according to some examples of the present disclosure.

Turning now to FIG. 3, a method 300 for automatically cropping an image is shown according to some examples of the present disclosure. Method 300 may be performed by a cropping system (e.g., cropping system 210) that is instantiated by a computing device. At operation 310 the system may receive a digital image. The digital image may be received over a network from another computing device, from another component or application on the computing device (e.g., from an image capture program or driver), from a storage location, or the like. At operation 315 the cropping system may determine one or more areas of interest. For example, by applying one or more methods, such as facial recognition matching, emotion detection, and landmark detection to produce areas of interest. At operation 317 the system may determine the cropping area based upon the areas of interest. For example, selecting one, more than one, or all of the areas of interest and determining a cropping rectangle that includes the selected areas of interest. In some examples, the cropping area is the smallest rectangle (or other geometric shape) that includes all the areas of interest.

At operation 320 the cropping system 210 may optionally present a graphical user interface (GUI) which may allow the user to make modifications to the cropping area. At operation 325 the cropping system 210 may optionally receive modifications, input indicating an acceptance of the cropping region, input indicating a rejection of the cropping region, or the like from the user. At operation 330, the cropping system may crop to the cropping region (which may have been modified in some examples by the input received in operation 325).

Figure 4:
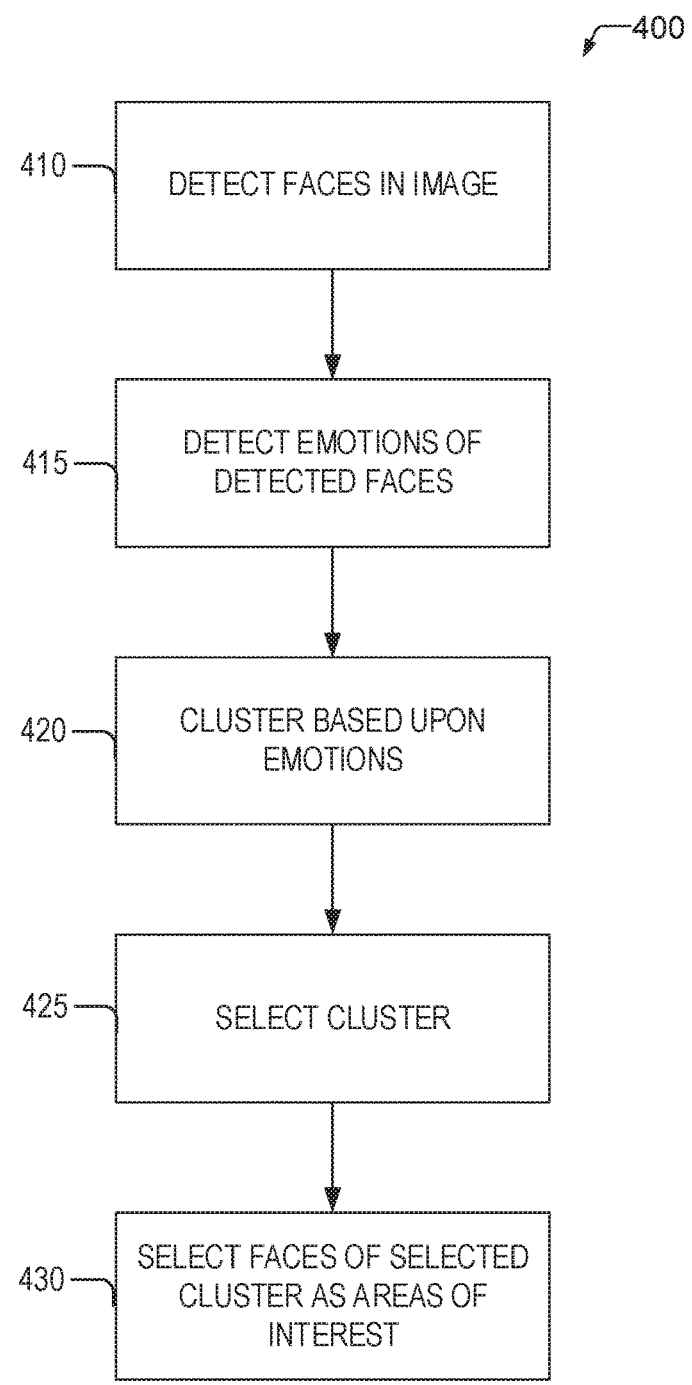
FIG. 4 shows a method of cropping based upon emotion detection according to some examples of the present disclosure.

Turning now to FIG. 4, a method 400 of cropping based upon emotion detection is shown according to some examples of the present disclosure. Method 400 may be an example of operation 315 from FIG. 3. At operation 410 the system may utilize a face detection algorithm to detect faces in the digital image. For example, by utilizing genetic algorithms. At operation 415 the system may detect emotions from the detected faces. For example, the system may employ the FACS to code facial expressions and then utilize a Bayesian network to determine the emotions based upon one or more of the FACS codings assigned to the facial expression. At operation 420 the system may cluster the images based upon the emotions, and in some examples, based upon the location of the detected faces in the image. For example, similar emotions (as determined by a predetermined list of similar emotions) within a predetermined proximity of each other may be clustered into a group of faces.

At operation 425, the system may select a cluster of faces. The selection may be based upon number—e.g., the system may select the cluster with the greatest number of faces, the selection may be based upon location in the image (e.g., faces in the center of the image), and the like. In some examples, more than one (or all) of the clusters may be selected. At operation 430 the faces of the selected cluster are returned as areas of interest that may be utilized to determine a cropping region (e.g., such as at operation 317).

Figure 5:
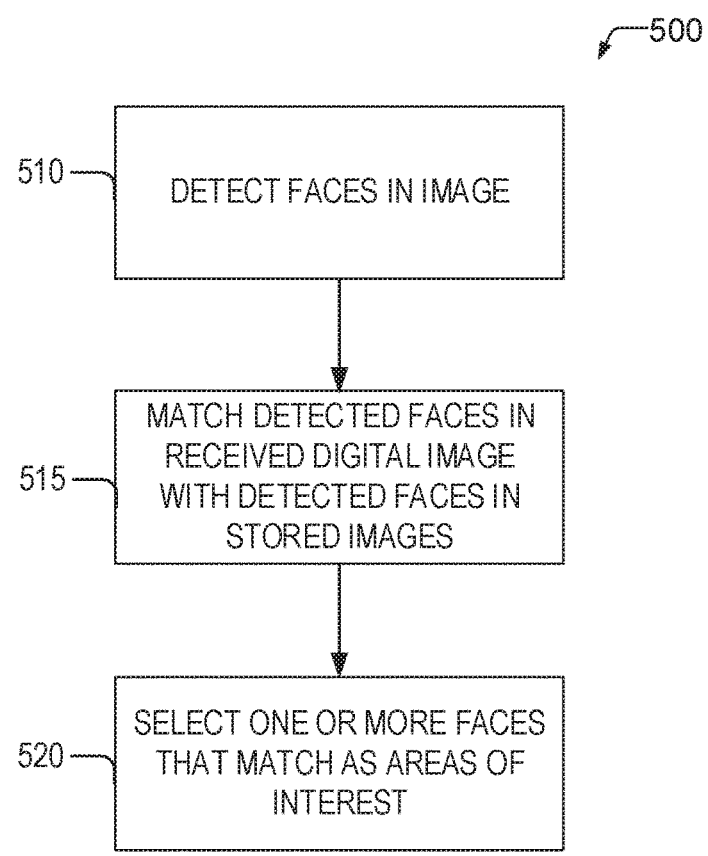
FIG. 5 shows a method of cropping based upon facial recognition according to some examples of the present disclosure.

Turning now to FIG. 5 a method 500 of cropping using facial recognition is shown according to some examples of the present disclosure. Method 500 may be an example of operation 315 from FIG. 3. At operation 510 the faces in the received digital image may be detected. This may be done utilizing a face detection algorithm such as a genetic algorithm. At operation 515 the system may utilize a face matching algorithm to determine whether a similar face appears in a digital image in the collection of digital images belonging to the user. As noted, facial recognition techniques may be utilized such as principal component analysis using eigen-faces, linear discriminant analysis, elastic bunch graph matching, hidden Markov models, and the like. For example, the algorithm may identify facial features by extracting landmarks (e.g., size and shape of the eyes, position of the mouth, and shape of the jaw) from an image of the subject's face. These features may be utilized to search for other images that have similar features. At operation 520 the system may select one, more than one, or all of the matching faces to return as areas of interest. For example, if a single face matches, that location of that face may be returned. If multiple faces match, multiple areas of interest may be returned that correspond to the matched faces. In some examples, the system may select one or more (but not all) of the matching faces to return.

Figure 6:
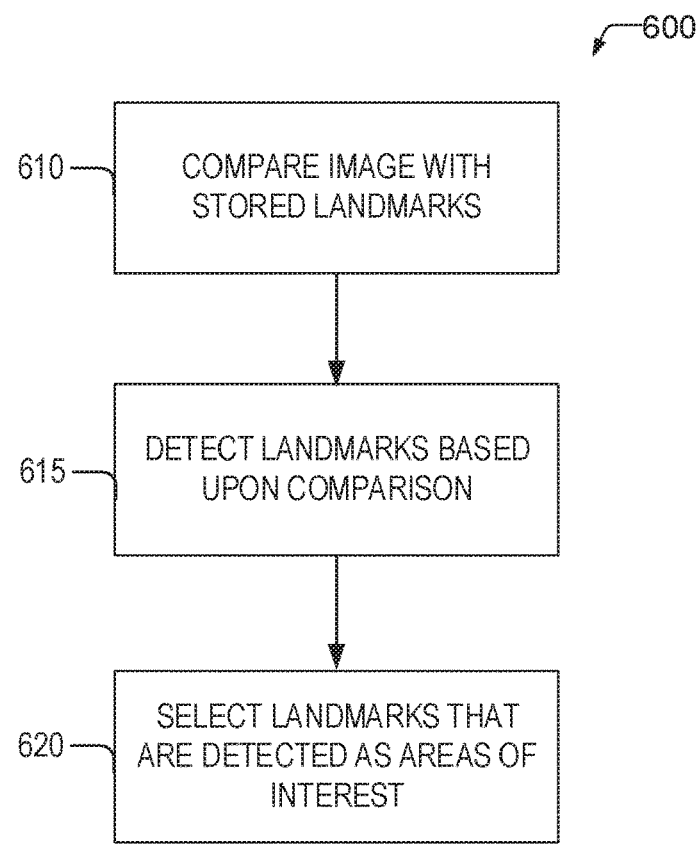
FIG. 6 shows a method of cropping based upon landmark detection according to some examples of the present disclosure.

Turning now to FIG. 6, a method 600 of a landmark detection cropping algorithm is shown according to some examples of the present disclosure. Method 600 may be an example of operation 315 from FIG. 3. At operation 610 the system may compare the image to stored images of landmarks to detect matches 615. For example, the system may utilize a machine learning algorithm to determine if a landmark is present in the digital image. For example, a genetic algorithm, principal component analysis, linear discriminant analysis, elastic bunch graph matching, hidden Markov models, and the like. At operation 620 the system may select one, more than one, or all of the landmarks that are matched to return as areas of interest.

Figure 7:
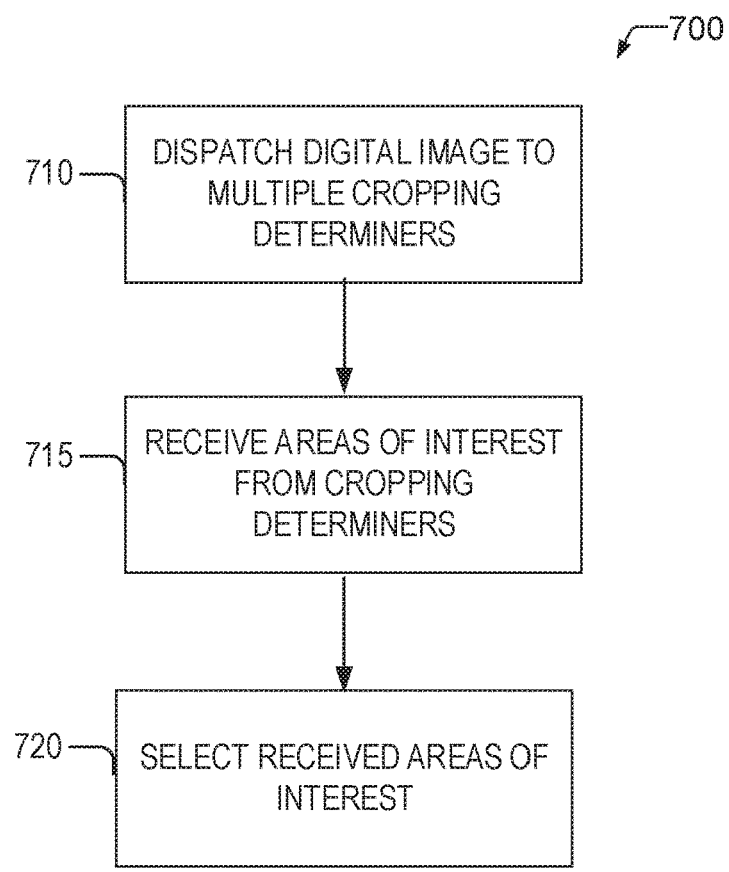
FIG. 7 shows a method of combining multiple cropping methods to produce an automatic cropping according to some examples of the present disclosure.

Turning now to FIG. 7, a method 700 of combining multiple cropping methods to produce an automatic cropping is shown according to some examples of the present disclosure. Method 700 may be an example of operation 315 from FIG. 3. At operation 710, the cropping system dispatches the digital image to multiple cropping determiners (that apply different cropping methods to determine areas of interest in the image). For example, one or more of the emotion detection, facial recognition matching, landmark detection, and the like. In other examples, the system may also dispatch the digital image to other cropping determiners not herein discussed. At operation 715 the cropping determiners may return, and the cropping system may receive, areas of interest determined by each of the cropping determiners.

At operation 720, the system may determine regions of interest to utilize for determining a cropping region based upon the returned areas of interest. In some examples, the areas of interest received at operation 715 may be clustered based upon location that is, areas of interest that are near each other may be clustered. Clusters that contain over a predetermined threshold of areas of interest, or the top predetermined number or percent of areas of interest may be selected. In other examples, the areas of interest may have a corresponding confidence score. The system may select areas of interest for inclusion in the cropping region based upon the confidence scores. For example, areas of interest that have corresponding confidence scores above a predetermined threshold may be selected. In some examples, the top predetermined number or percentage of areas of interest (as ranked by confidence score) may be selected. In some examples, the confidence scores may be multiplied by a weighting factor to produce a score for each area of interest. The weighting factors may be predetermined, may be determined based upon a machine learning algorithm, or the like.

Figure 8:
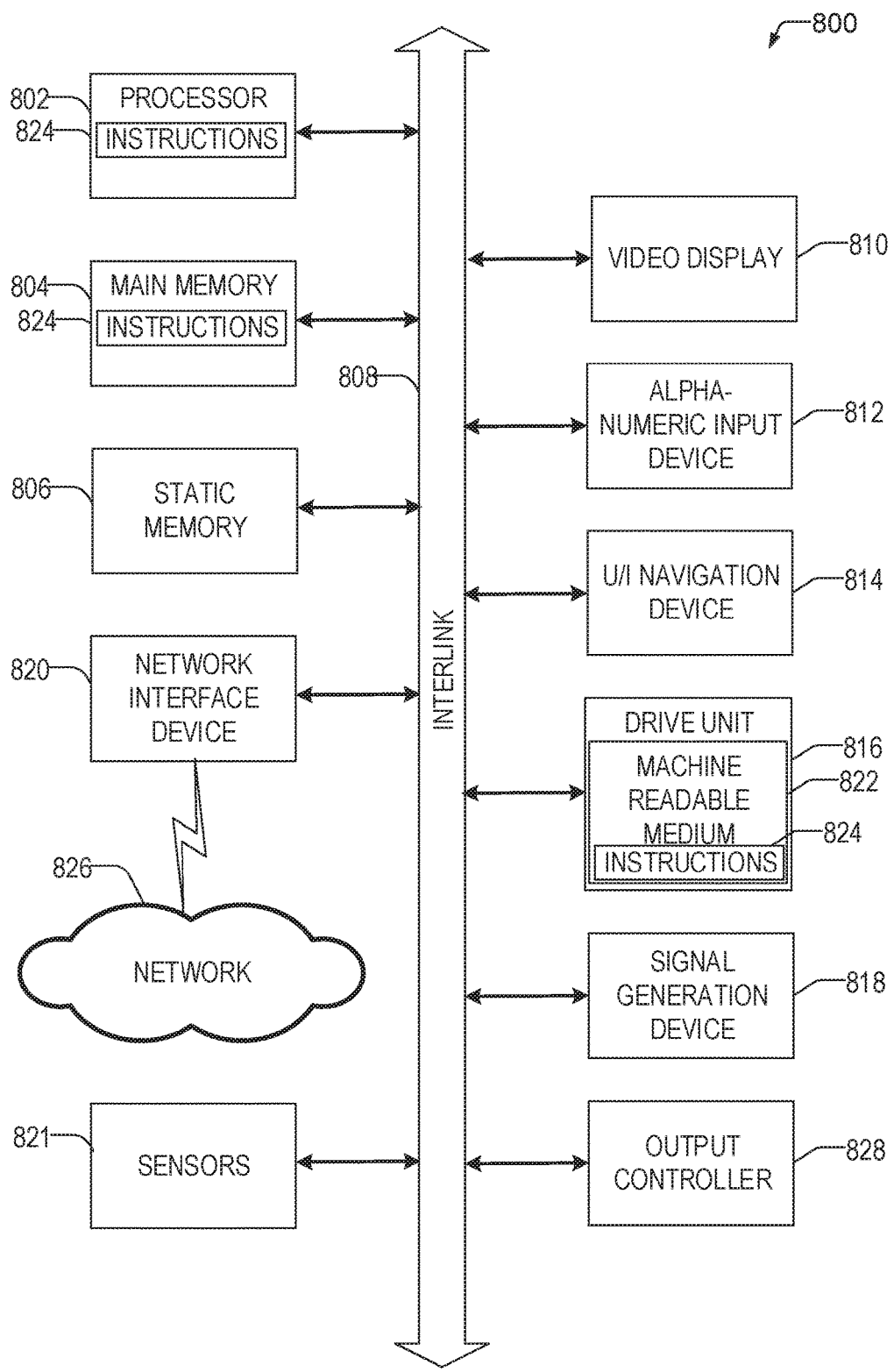
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. For example, the machine 800 may be a computing device that may implement the cropping system 210, social networking service 240, first image library 235, second image library 245, and the methods of FIGS. 3-7. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 824 may further be transmitted or received over a communications network 826 using a transmission medium via the network interface device 820. The Machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example; the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

OTHER NOTES AND EXAMPLES

Example 1 is a machine-readable medium, the machine-readable medium including instructions, which when executed by a machine, cause the machine to perform operations comprising: receiving a digital image; detecting three or more faces in the digital image; for each particular face in the three or more faces, determining an emotion displayed by the particular face; clustering the three or more faces into two or more clusters, each particular cluster comprising faces displaying emotions that are the same or are classified as related to other faces in the particular cluster; selecting a cluster of the two or more clusters; and cropping the digital image based upon the faces in the selected cluster.

In Example 2, the subject matter of Example 1 optionally includes wherein the operations of cropping the digital image based upon the faces in the selected cluster comprises operations of cropping the digital image so as not to include a face in a cluster of the two or more clusters that was not selected.

In Example 3, the subject matter of any one or more of Examples 1-2 optionally include wherein the operations further comprise: for each particular face in the set of three or more faces, searching for a matching face in an image storage corresponding to a user; and responsive to determining that a face in the set of three or more faces matches a face in an image stored in the image storage of the user, cropping the digital image based additionally upon the matched face.

In Example 4, the subject matter of Example 3 optionally includes wherein the image storage is a network-based image storage.

In Example 5, the subject matter of any one or more of Examples 3-4 optionally include wherein the image storage is a social networking service.

In Example 6, the subject matter of Example 5 optionally includes wherein images of the image storage correspond to social media posts of the user or posts of connections of the user on the social networking service.

In Example 7, the subject matter of any one or more of Examples 1-6 optionally include wherein the operations further comprise: detecting a landmark in the digital image; and cropping the digital image based additionally upon the landmark.

In Example 8, the subject matter of Example 7 optionally includes wherein the landmark is detected based upon a comparison of features of the digital image with features of a library of digital images including landmarks.

In Example 9, the subject matter of any one or more of Examples 1-8 optionally include wherein the operations further comprise: for each particular face in the set of three or more faces, searching for a matching face in an image storage of a user; detecting a landmark in the digital image; and cropping the digital image based upon the matching face, the landmark, and the set of faces in the selected cluster.

In Example 10, the subject matter of Example 9 optionally includes wherein the operations of cropping the digital image based upon the matching face, the landmark, and the faces in the selected cluster comprises the operations of: producing a first score based upon a first confidence value corresponding to the set of three or more faces in the selected cluster and a first weighting factor; producing a second score based upon a second confidence value corresponding to the matching face and a second weighting factor; producing a third score based upon a third confidence value corresponding to the landmark and a third weighting factor; and cropping the digital image based upon the first, second and third scores.

In Example 11, the subject matter of Example 10 optionally includes wherein the first, second, and third weighting factors are determined based upon a machine learning algorithm.

In Example 12, the subject matter of Example 11 optionally includes wherein a rejection by the user of the cropped digital image is used to adjust one or more of the first, second, or third weighting factors.

Example 13 is a system for cropping an image, the system comprising: a processor; a memory including instructions, which when executed by the processor, cause the system to perform operations comprising: receiving a digital image; detecting three or more faces in the digital image; for each particular face in the three or more faces, determining an emotion displayed by the particular face; clustering the three or more faces into two or more clusters, each particular cluster comprising faces displaying emotions that are the same or are classified as related to other faces in the particular cluster; selecting a cluster of the two or more clusters; and cropping the digital image based upon the faces in the selected cluster.

In Example 14, the subject matter of Example 13 optionally includes wherein the operations of cropping the digital image based upon the faces in the selected cluster comprises operations of cropping the digital image so as not to include a face in a cluster of the two or more clusters that was not selected.

In Example 15, the subject matter of any one or more of Examples 13-14 optionally include wherein the operations further comprise: for each particular face in the set of three or more faces, searching for a matching face in an image storage corresponding to a user; and responsive to determining that a face in the set of three or more faces matches a face in an image stored in the image storage of the user, cropping the digital image based additionally upon the matched face.

In Example 16, the subject matter of Example 15 optionally includes wherein the image storage is a network-based image storage.

In Example 17, the subject matter of any one or more of Examples 15-16 optionally include wherein the image storage is a social networking service.

In Example 18, the subject matter of Example 17 optionally includes wherein images of the image storage correspond to social media posts of the user or posts of connections of the user on the social networking service.

In Example 19, the subject matter of any one or more of Examples 13-18 optionally include wherein the operations further comprise: detecting a landmark in the digital image; and cropping the digital image based additionally upon the landmark.

In Example 20, the subject matter of Example 19 optionally includes wherein the landmark is detected based upon a comparison of features of the digital image with features of a library of digital images including landmarks.

In Example 21, the subject matter of any one or more of Examples 13-20 optionally include wherein the operations further comprise: for each particular face in the set of three or more faces, searching for a matching face in an image storage of a user; detecting a landmark in the digital image; and cropping the digital image based upon the matching face, the landmark, and the set of faces in the selected cluster.

In Example 22, the subject matter of Example 21 optionally includes wherein the operations of cropping the digital image based upon the matching face, the landmark, and the faces in the selected cluster comprises the operations of: producing a first score based upon a first confidence value corresponding to the set of three or more faces in the selected cluster and a first weighting factor; producing a second score based upon a second confidence value corresponding to the matching face and a second weighting factor; producing a third score based upon a third confidence value corresponding to the landmark and a third weighting factor; and cropping the digital image based upon the first, second and third scores.

In Example 23, the subject matter of Example 22 optionally includes wherein the first, second, and third weighting factors are determined based upon a machine learning algorithm.

In Example 24, the subject matter of Example 23 optionally includes wherein a rejection by the user of the cropped digital image is used to adjust one or more of the first, second, or third weighting factors.

Example 25 is a method for cropping an image, the method comprising: receiving a digital image; detecting three or more faces in the digital image; for each particular face in the three or more faces, determining an emotion displayed by the particular face; clustering the three or more faces into two or more clusters, each particular cluster comprising faces displaying emotions that are the same or are classified as related to other faces in the particular cluster; selecting a cluster of the two or more clusters; and cropping the digital image based upon the faces in the selected cluster.

In Example 26, the subject matter of Example 25 optionally includes wherein cropping the digital image based upon the faces in the selected cluster comprises cropping the digital image so as not to include a face in a cluster of the two or more clusters that was not selected.

In Example 27, the subject matter of any one or more of Examples 25-26 optionally include for each particular face in the set of three or more faces, searching for a matching face in an image storage corresponding to a user; and responsive to determining that a face in the set of three or more faces matches a face in an image stored in the image storage of the user, cropping the digital image based additionally upon the matched face.

In Example 28, the subject matter of Example 27 optionally includes wherein the image storage is a network-based image storage.

In Example 29, the subject matter of any one or more of Examples 27-28 optionally include wherein the image storage is a social networking service.

In Example 30, the subject matter of Example 29 optionally includes wherein images of the image storage correspond to social media posts of the user or posts of connections of the user on the social networking service.

In Example 31, the subject matter of any one or more of Examples 25-30 optionally include detecting a landmark in the digital image; and cropping the digital image based additionally upon the landmark.

In Example 32, the subject matter of Example 31 optionally includes wherein the landmark is detected based upon a comparison of features of the digital image with features of a library of digital images including landmarks.

In Example 33, the subject matter of any one or more of Examples 25-32 optionally include for each particular face in the set of three or more faces, searching for a matching face in an image storage of a user; detecting a landmark in the digital image; and cropping the digital image based upon the matching face, the landmark, and the set of faces in the selected cluster.

In Example 34, the subject matter of Example 33 optionally includes wherein cropping the digital image based upon the matching face, the landmark, and the faces in the selected cluster comprises: producing a first score based upon a first confidence value corresponding to the set of three or more faces in the selected cluster and a first weighting factor; producing a second score based upon a second confidence value corresponding to the matching face and a second weighting factor; producing a third score based upon a third confidence value corresponding to the landmark and a third weighting factor; and cropping the digital image based upon the first, second and third scores.

In Example 35, the subject matter of Example 34 optionally includes wherein the first, second, and third weighting factors are determined based upon a machine learning algorithm.

In Example 36, the subject matter of Example 35 optionally includes wherein a rejection by the user of the cropped digital image is used to adjust one or more of the first, second, or third weighting factors.

Example 37 is a device for cropping an image, the device comprising: means for receiving a digital image; means for detecting three or more faces in the digital image; for each particular face in the three or more faces, means for determining an emotion displayed by the particular face; means for clustering the three or more faces into two or more clusters, each particular cluster comprising faces displaying emotions that are the same or are classified as related to other faces in the particular cluster; means for selecting a cluster of the two or more clusters; and means for cropping the digital image based upon the faces in the selected cluster.

In Example 38, the subject matter of Example 37 optionally includes wherein the means for cropping the digital image based upon the faces in the selected cluster comprises means for cropping the digital image so as not to include a face in a cluster of the two or more clusters that was not selected.

In Example 39, the subject matter of any one or more of Examples 37-38 optionally include for each particular face in the set of three or more faces, means for searching for a matching face in an image storage corresponding to a user; and responsive to determining that a face in the set of three or more faces matches a face in an image stored in the image storage of the user, means for cropping the digital image based additionally upon the matched face.

In Example 40, the subject matter of Example 39 optionally includes wherein the image storage is a network-based image storage.

In Example 41, the subject matter of any one or more of Examples 39-40 optionally include wherein the image storage is a social networking service.

In Example 42, the subject matter of Example 41 optionally includes wherein images of the image storage correspond to social media posts of the user or posts of connections of the user on the social networking service.

In Example 43, the subject matter of any one or more of Examples 37-42 optionally include means for detecting a landmark in the digital image; and means for cropping the digital image based additionally upon the landmark.

In Example 44, the subject matter of Example 43 optionally includes wherein the landmark is detected based upon a comparison of features of the digital image with features of a library of digital images including landmarks.

In Example 45, the subject matter of any one or more of Examples 37-44 optionally include for each particular face in the set of three or more faces, means for searching for a matching face in an image storage of a user; means for detecting a landmark in the digital image; and means for cropping the digital image based upon the matching face, the landmark, and the set of faces in the selected cluster.

In Example 46, the subject matter of Example 45 optionally includes wherein the means for cropping the digital image based upon the matching face, the landmark, and the faces in the selected cluster comprises: means for producing a first score based upon a first confidence value corresponding to the set of three or more faces in the selected cluster and a first weighting factor; means for producing a second score based upon a second confidence value corresponding to the matching face and a second weighting factor; means for producing a third score based upon a third confidence value corresponding to the landmark and a third weighting factor; and means for cropping the digital image based upon the first, second and third scores.

In Example 47, the subject matter of Example 46 optionally includes wherein the first, second, and third weighting factors are determined based upon a machine learning algorithm.

In Example 48, the subject matter of Example 47 optionally includes wherein a rejection by the user of the cropped digital image is used to adjust one or more of the first, second, or third weighting factors.

What is claimed is:

1. A machine-readable storage device, storing instructions, which when executed by a machine, cause the machine to perform operations comprising:
    receiving a digital image;
    detecting three or more faces in the digital image;
    for each particular face in the three or more faces, determining an emotion displayed by the particular face;
    clustering the three or more faces into two or more clusters, each particular cluster comprising faces displaying emotions that are the same or are classified as related to other faces in the particular cluster;
    selecting a cluster of the two or more clusters; and
    cropping the digital image based upon the faces in the selected cluster.

2. The machine-readable storage device of claim 1, wherein the operations of cropping the digital image based upon the faces in the selected cluster comprises operations of cropping the digital image so as not to include a face in a cluster of the two or more clusters that was not selected.

3. The machine-readable storage device of claim 1, wherein the operations further comprise:
    for each particular face in the set of three or more faces, searching for a matching face in an image storage corresponding to a user; and
    responsive to determining that a face in the set of three or more faces matches a face in an image stored in the image storage of the user, cropping the digital image based additionally upon the matched face.

4. The machine-readable storage device of claim 3, wherein the image storage is a network-based image storage.

5. The machine-readable storage device of claim 3, wherein the image storage is a social networking service.

6. The machine-readable storage device of claim 5, wherein images of the image storage correspond to social media posts of the user or posts of connections of the user on the social networking service.

7. The machine-readable storage device of claim 1, wherein the operations further comprise:
    detecting a landmark in the digital image; and
    cropping the digital image based additionally upon the landmark.

8. The machine-readable storage device of claim 7, wherein the landmark is detected based upon a comparison of features of the digital image with features of a library of digital images including landmarks.

9. The machine-readable storage device of claim 1, wherein the operations further comprise:
    for each particular face in the set of three or more faces, searching for a matching face in an image storage of a user;
    detecting a landmark in the digital image; and
    cropping the digital image based upon the matching face, the landmark, and the set of faces in the selected cluster.

10. The machine-readable storage device of claim 9, wherein the operations of cropping the digital image based upon the matching face, the landmark, and the faces in the selected cluster comprises the operations of:

producing a first score based upon a first confidence value corresponding to the set of three or more faces in the selected cluster and a first weighting factor;

producing a second score based upon a second confidence value corresponding to the matching face and a second weighting factor;

producing a third score based upon a third confidence value corresponding to the landmark and a third weighting factor; and cropping the digital image based upon the first, second and third scores.

11. The machine-readable storage device of claim 10, wherein the first, second, and third weighting factors are determined based upon a machine learning algorithm.

12. The machine-readable storage device of claim 11, wherein a rejection by the user of the cropped digital image is used to adjust one or more of the first, second, or third weighting factors.

13. A system for cropping an image, the system comprising:

a processor;

a memory including instructions, which when executed by the processor, cause the system to perform operations comprising:

receiving a digital image;

detecting three or more faces in the digital image;

for each particular face in the three or more faces, determining an emotion displayed by the particular face;

clustering the three or more faces into two or more clusters, each particular cluster comprising faces displaying emotions that are the same or are classified as related to other faces in the particular cluster;

selecting a cluster of the two or more clusters; and cropping the digital image based upon the faces in the selected cluster.

14. The system of claim 13, wherein the operations of cropping the digital image based upon the faces in the selected cluster comprises operations of cropping the digital image so as not to include a face in a cluster of the two or more clusters that was not selected.

15. The system of claim 13, wherein the operations further comprise:

for each particular face in the set of three or more faces, searching for a matching face in an image storage corresponding to a user; and responsive to determining that a face in the set of three or more faces matches a face in an image stored in the image storage of the user, cropping the digital image based additionally upon the matched face.

16. The system of claim 13, wherein the operations further comprise:

for each particular face in the set of three or more faces, searching for a matching face in an image storage of a user;

detecting a landmark in the digital image; and cropping the digital image based upon the matching face, the landmark, and the set of faces in the selected cluster.

17. A method for cropping an image, the method comprising:

receiving a digital image;

detecting three or more faces in the digital image;

for each particular face in the three or more faces, determining an emotion displayed by the particular face;

clustering the three or more faces into two or more clusters, each particular cluster comprising faces displaying emotions that are the same or are classified as related to other faces in the particular cluster;

selecting a cluster of the two or more clusters; and cropping the digital image based upon the faces in the selected cluster.

18. The method of claim 17, comprising:

for each particular face in the set of three or more faces, searching for a matching face in an image storage corresponding to a user; and responsive to determining that a face in the set of three or more faces matches a face in an image stored in the image storage of the user, cropping the digital image based additionally upon the matched face.

19. The method of claim 17, comprising:

for each particular face in the set of three or more faces, searching for a matching face in an image storage of a user;

detecting a landmark in the digital image; and cropping the digital image based upon the matching face, the landmark, and the set of faces in the selected cluster.

20. The method of claim 19, wherein cropping the digital image based upon the matching face, the landmark, and the faces in the selected cluster comprises:

producing a first score based upon a first confidence value corresponding to the set of three or more faces in the selected cluster and a first weighting factor;

producing a second score based upon a second confidence value corresponding to the matching face and a second weighting factor;

producing a third score based upon a third confidence value corresponding to the landmark and a third weighting factor; and cropping the digital image based upon the first, second and third scores.

* * * * *